US012386767B2

(12) United States Patent
Abhishek et al.

(10) Patent No.: US 12,386,767 B2
(45) Date of Patent: Aug. 12, 2025

(54) METHOD AND APPARATUS FOR USING LOCAL AREA NETWORK AS SERVICE FOR EDGE CLOUD

(71) Applicant: Tencent America LLC, Palo Alto, CA (US)

(72) Inventors: Rohit Abhishek, San Jose, CA (US); Paul Spencer Dawkins, Garland, TX (US); Arianne Hinds, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 97 days.

(21) Appl. No.: 17/969,230

(22) Filed: Oct. 19, 2022

(65) Prior Publication Data
US 2023/0126595 A1  Apr. 27, 2023

Related U.S. Application Data

(60) Provisional application No. 63/271,611, filed on Oct. 25, 2021.

(51) Int. Cl.
*G06F 13/40* (2006.01)
*G06F 9/50* (2006.01)

(52) U.S. Cl.
CPC ........ *G06F 13/4022* (2013.01); *G06F 9/5072* (2013.01); *G06F 9/5077* (2013.01); *G06F 9/5083* (2013.01)

(58) Field of Classification Search
CPC .. G06F 13/4022; G06F 9/5072; G06F 9/5077; G06F 9/5083; G06F 9/5094
USPC ....................................................... 709/224
See application file for complete search history.

(56) References Cited

U.S. PATENT DOCUMENTS 6,337,863 B1    1/2002  Nair et al.
2011/0082935 A1  4/2011  Zetterman et al.
(Continued)

FOREIGN PATENT DOCUMENTS

DE  102016224316 A1 *  6/2017  ............ H04L 65/60
JP      2004536495 A *  2/2004  ............ H04L 12/28
(Continued)

OTHER PUBLICATIONS

International Search Report dated Mar. 14, 2023 in Application No. PCT/US22/47368.
(Continued)

*Primary Examiner* — Emmanuel L Moise
*Assistant Examiner* — Mariegeorges A Henry
(74) *Attorney, Agent, or Firm* — Sughrue Mion, PLLC

(57) ABSTRACT

A method for receiving, by a plurality of user devices within a Local Area Network (LAN), a request to create a local cloud within the LAN, selecting, by one of the plurality of user devices, a master device from among the plurality of user devices, and one or more devices from among the plurality of user devices based on a resource availability, requesting, by the master device, each of the one or more devices to share resources of the device for the local cloud, and configuring, by the master device, the one or more devices as the local cloud. The master device receives a service request for a service to be performed by the local cloud, and distributes a plurality of tasks corresponding to the service to the one or more devices configured as the local cloud according to the resource availability of the one or more devices.

15 Claims, 7 Drawing Sheets

(56) References Cited

U.S. PATENT DOCUMENTS

| | | | |
|---|---|---|---|
| 2012/0110055 A1 | 5/2012 | Van Biljon et al. | |
| 2013/0278412 A1* | 10/2013 | Kelly | G08B 26/00 |
| | | | 340/539.1 |
| 2014/0189120 A1* | 7/2014 | Vicente | G06F 9/5072 |
| | | | 709/226 |
| 2016/0044035 A1 | 2/2016 | Huang | |
| 2017/0223117 A1 | 8/2017 | Messerli et al. | |
| 2017/0230448 A1* | 8/2017 | Liu | H04L 67/1001 |
| 2019/0004868 A1* | 1/2019 | Zhou | G06T 1/20 |

FOREIGN PATENT DOCUMENTS

| | | | | |
|---|---|---|---|---|
| JP | 2016-535340 A | 11/2016 | | |
| WO | WO-2014090150 A1 * | 6/2014 | | H04L 45/66 |
| WO | 2021/079357 A1 | 4/2021 | | |

OTHER PUBLICATIONS

Written Opinion of the International Searching Authority dated Mar. 14, 2023 in Application No. PCT/US22/47368.
Communication issued Dec. 3, 2024 in Japanese Application No. 2023-565266.
Extended European Search Report issued Jan. 16, 2025 in European Application No. 22887971.4.
Dbouk et al: "A Novel Ad-Hoc Mobile Edge Cloud Offering Security Services Through Intelligent Resource-Aware Offloading", IEEE Transactions on Network and Service Management, vol. 16, Vo. 4, Dec. 2019, pp. 1665-1680, (pp. 1-16 total).

* cited by examiner

METHOD AND APPARATUS FOR USING LOCAL AREA NETWORK AS SERVICE FOR EDGE CLOUD

CROSS-REFERENCE TO RELATED APPLICATION

This application is based on and claims priority to U.S. Provisional Patent Application No. 63/271,611, filed on Oct. 25, 2021, the disclosure of which is incorporated by reference herein in its entirety.

FIELD

Apparatuses and methods consistent with example embodiments of the present disclosure relate to methods and systems for creating a local cloud server comprising of multiple devices, which may be used as a service for an edge cloud.

BACKGROUND

Cloud computing may be defined to be an on-demand access, via internet, to computing resources, applications, servers, data storage, development tools, networking capabilities, and hosted at a remote data center managed by a cloud services provider (CSP). Typically, cloud-computing may be offered as a subscription-based service. A cloud-based subscription helps to lower the resource cost by cutting down the costs associated with purchase, installment, etc. Cloud-based subscription may be used to improve the agility and time-to-value and may be scaled more easily in a cost-effective manner.

There is more focus on concepts of internet of things (IoT), Artificial Intelligence (AI), Machine learning (MI), and Immersive Media as there continues to be an exponential growth in the number of internet devices. Performing computation at data centers or cloud servers (e.g., at a geographically different location) may not be an efficient approach since this computation requires significant bandwidth to move the data from the user to the cloud or data center and back, and also adds latency.

Edge computing brings the computing power closer to the users by placing the resources at the network edge, thereby reducing the network delay, reducing bandwidth requirement to an upper cloud, enhancing reliability and cost reduction. Edge computing enables the computation of data closer to the user instead of travelling a farther distance going through multiple hops and relying on the cloud network.

The main benefit that network operators rely on in the use of Edge Computing may include real-time dynamic computing being closer to the users thereby, reducing latency; cost reduction since users place less load on cloud servers; and higher Quality of Experience (QoE) since the servers are closer to the user providing faster traffic delivery.

However, when using immersive technologies like Lightfield, Augmented Reality (AR), and Virtual Reality (VR), a high-end hardware device is required. The requirement arises because these applications are likely to require a huge amount of processing power and storage to give the user the feeling of being in a truly immersive environment. With the current state of affairs, there are about 46 billion devices which is expected to jump to 125 billion in 2030. Many of these devices have excess storage and processing capacity that could be used by other devices. As such, these applications require real-time video stream processing to recognize specific objects, and some applications may even require generation of new video frames.

Therefore, the current challenges in using immersive technologies have been the processing capacity, storage capacity, energy consumption, and weight of the device. All of these challenges are becoming more problematic due to the massive processing requirements of the applications running on the device. For example, immersive technologies, which require users to wear a headset, may result in the user having an uncomfortable experience due to the heavy devices. Additionally, the high processing capacity makes the device more expensive including lightfield devices, which rely heavily on GPUs to meet the application's requirements. That is, with limited resource availability for the device, processing tasks that require more than available resources add computational latencies. Therefore, there exists a gap between the capabilities of the current state of the art and future requirements.

With the current state of affairs, there are about 46 billion devices which is expected to jump to 125 billion in 2030. Many of these devices will have excess storage and processing capacity that could be used by other devices.

SUMMARY

According to some embodiments, a method may be provided including receiving, by a plurality of user devices within a Local Area Network (LAN), a request to create a local cloud within the LAN, selecting, by one of the plurality of user devices, a master device from among the plurality of user devices, selecting, by the master device, one or more devices from among the plurality of user devices based on a resource availability of each of the plurality of user devices, requesting, by the master device, each of the one or more devices to share resources of the device for the local cloud, configuring, by the master device, the one or more devices as the local cloud, receiving, by the master device, a service request for a service to be performed by the local cloud, and distributing a plurality of tasks corresponding to the service to the one or more devices configured as the local cloud according to the resource availability of the one or more devices.

According to exemplary embodiments, an apparatus may be provided that includes at least one memory configure to store computer program code and at least one processor configured to access said at least one memory and operate as instructed by said computer program code. The computer program code includes first receiving code configured to cause the at least one processor to receive, by a plurality of user devices within a Local Area Network (LAN), a request to create a local cloud within the LAN, first selecting code configured to cause the at least one processor to select, by one of the plurality of user devices, a master device from among the plurality of user devices, second selecting code configured to cause the at least one processor to select, by the master device, one or more devices from among the plurality of user devices based on a resource availability of each of the plurality of user devices, requesting code configured to cause the at least one processor to request, by the master device, each of the one or more devices to share resources of the device for the local cloud, configuration code configured to cause the at least one processor to configure, by the master device, the one or more devices as the local cloud, second receiving code configured to cause the at least one processor to receive, by the master device, a service request for a service to be performed by the local cloud, and distributing code configured to cause the at least one processor to distribute a plurality of tasks corresponding to the service to the one or more devices configured as the local cloud according to the resource availability of the one or more devices.

According to some embodiments, a non-transitory computer-readable recording medium may be provided having instruction store thereon, which when executed by at least one processor causes the processor to receive, by a plurality of user devices within a Local Area Network (LAN), a request to create a local cloud in the LAN, select, by one of the plurality of user devices, a master device from among the plurality of user devices, select, by the master device, one or more devices from among the plurality of user devices based on a resource availability of each of the plurality of user devices, request, by the master device, each of the one or more devices to share resources of the device for the local cloud, configuring, by the master device, the one or more devices as the local cloud, receive, by the master device, a service request for a service to be performed by the local cloud, and distribute a plurality of tasks corresponding to the service to the one or more devices configured as the local cloud according to the resource availability of the one or more devices.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

The disclosure describes methods and apparatuses for using Local Area Network (LAN) as service for an edge cloud by using the processing capacity of devices in the local network. The processing capacities of the plurality of devices connected within the LAN may be used to create a local cloud server. A master (device) is selected from the plurality of devices (slaves) and may be used to form master-slaves connection in order to allocate tasks. As such, the local cloud along with the master-slave connects may be used to provide service for the edge cloud.

Figure 1:
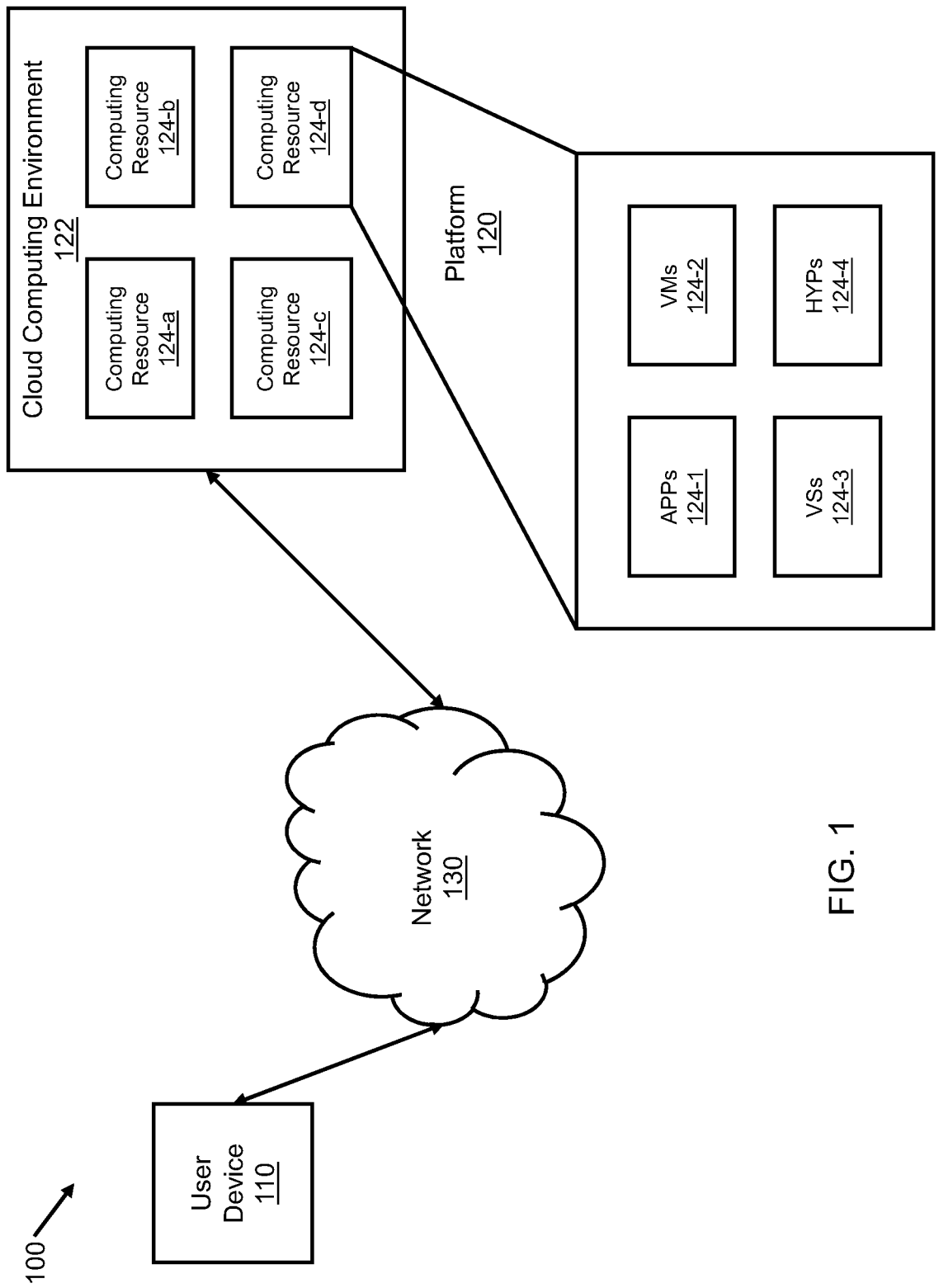
FIG. 1 is a diagram of an example environment in which systems and/or methods, described herein, may be implemented.

FIG. 1 is a diagram of an environment 100 in which methods, apparatuses and systems described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 may include one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some embodiments, the user device 110 may receive information from and/or transmit information to the platform 120.

The platform 120 may include one or more devices as described elsewhere herein. In some embodiments, the platform 120 may include a cloud server or a group of cloud servers. In some embodiments, the platform 120 may be designed to be modular such that software components may be swapped in or out. As such, the platform 120 may be easily and/or quickly reconfigured for different uses.

In some embodiments, as shown, the platform 120 may be hosted in a cloud computing environment 122. Notably, while some embodiments described herein describe the platform 120 as being hosted in the cloud computing environment 122, in some embodiments, the platform 120 may not be cloud-based (e.g., may be implemented outside of a cloud computing environment) or may be partially cloud-based.

The cloud computing environment 122 may include an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resources may include one or more personal computers 124-a, workstation computers 124-b, server devices 124-c, or other types of computation and/or communication devices 124-d. In some embodiments, the computing resource 124-d may host the platform 120. The cloud resources may include compute instances executing in the computing resource 124-c, storage devices provided in the computing resource 124-b, data transfer devices provided by the computing resource 124-a, etc. In some embodiments, the computing resource 124-d may communicate with other computing resources 124-a via wired connections, wireless connections, or a combination of wired and wireless connections.

As further shown in FIG. 1, the computing resource 124 may include a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 may include one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some embodiments, one application 124-1 may send/receive information to/from one or more other applications 124-1, via the virtual machine 124-2.

The virtual machine 124-2 may include a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some embodiments, the virtual machine 124-2 may execute on behalf of a user (e.g., the user device 110), and may manage infrastructure of the cloud computing environment 122, such as data management, synchronization, or long-duration data transfers.

The virtualized storage 124-3 may include one or more storage systems and/or one or more devices that use virtualization techniques within the storage systems or devices of the computing resource 124. In some embodiments, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 may include one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more operations described as being performed by another set of devices of the environment 100.

Figure 2:
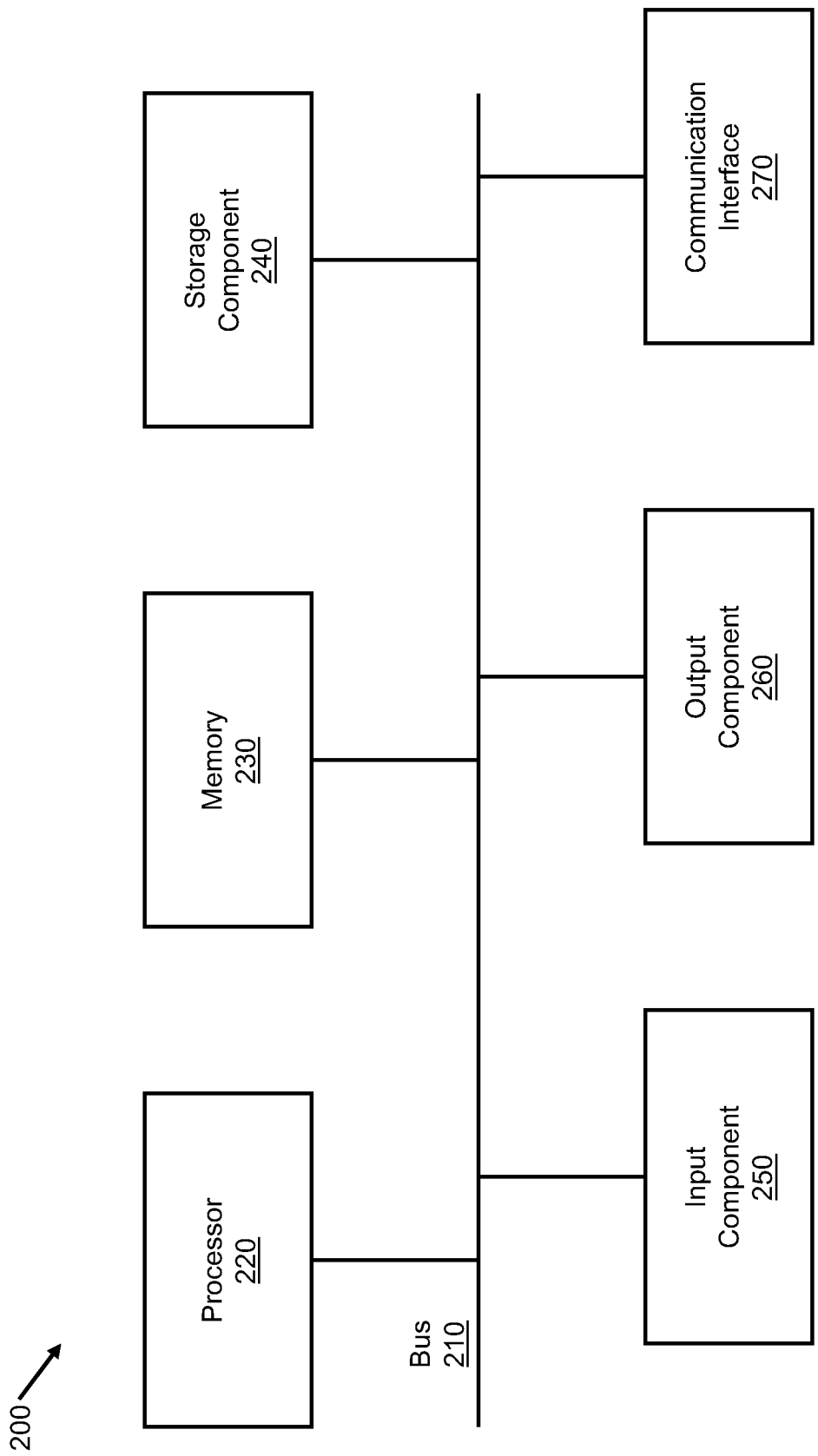
FIG. 2 is a diagram of example components of one or more device of FIG. 1.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 may include a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some embodiments, the processor 220 may include one or more processors capable of being programmed to perform an operation. The memory 230 may include a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 may include a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 may include a component that provides output information from the device 200 (e.g., a display, a speaker, and/or one or more light-emitting diodes (LEDs)).

The communication interface 270 may include a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes based on the processor 220 executing software instructions stored by a non-transitory computer-readable medium, such as the memory 230 and/or the storage component 240. A computer-readable medium is defined herein as a non-transitory memory device. A memory device may include memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more operations described as being performed by another set of components of the device 200.

Embodiments of the present disclosure are directed to a method and apparatus for using devices in a Local Area Network (LAN) as a service for an edge cloud by using the processing capacity of the devices in the LAN.

On average, a single household has about 10 devices connected to the internet, which may include mobile devices, tablets, laptops apart from other smart devices, which may also be connected. Assuming that an average house has 3 smart phones, 2 tablets and 2 laptops, and that each device utilizes 50% of its storage and computational resources, the average household would still have plenty of available resource to run a local edge cloud.

Figure 3:
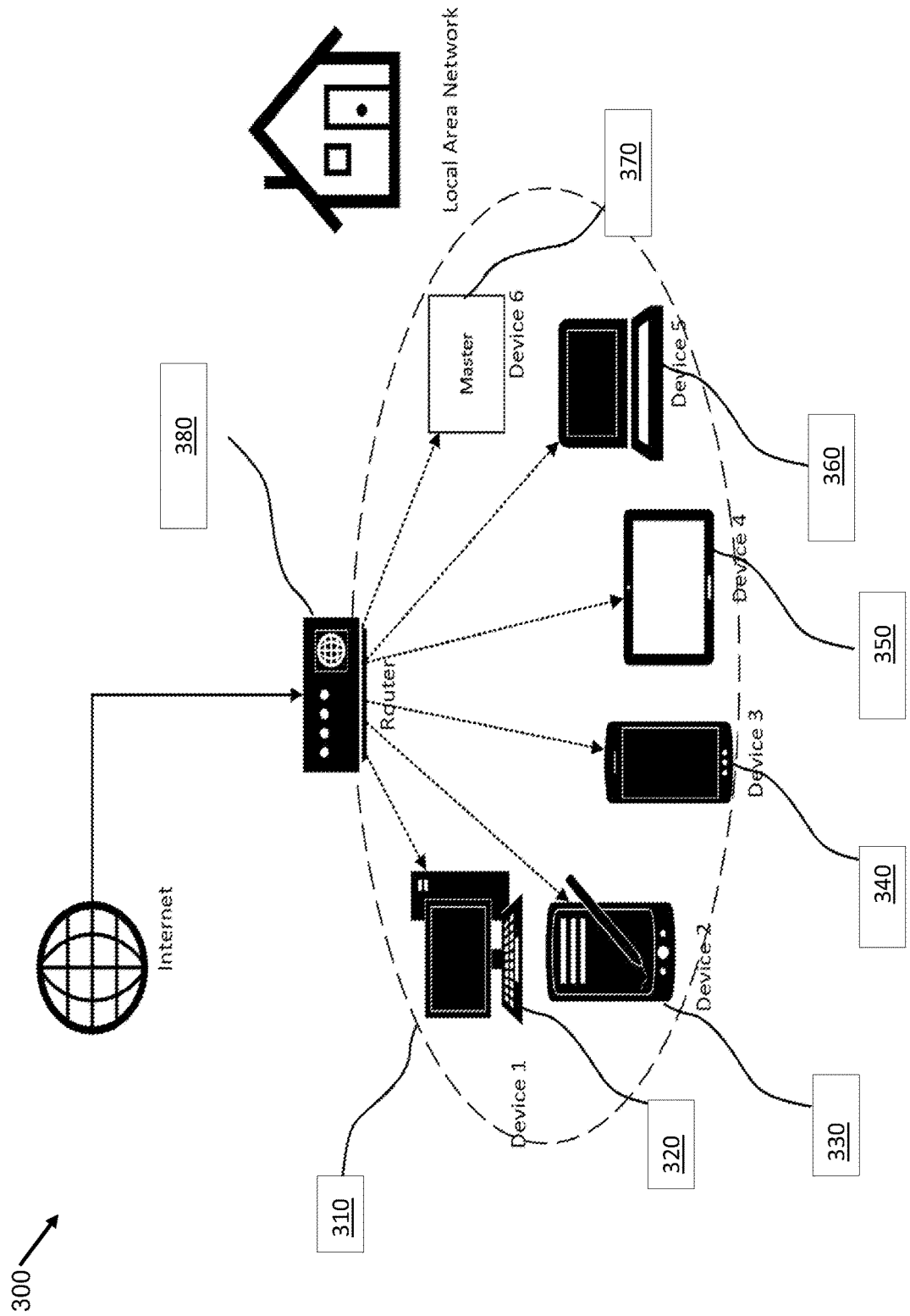
FIG. 3 is a diagram of an example Local Area Network.

FIG. 3 shows an example LAN network, where a gateway router 380 is provided as a gateway router for the LAN 310, in which different devices 1-6 (e.g., devices 320, 330, 340, 350, 360, 370) are connected to the network.

In some embodiments, resources from multiple devices in the LAN 310 may be used to create a local cloud server. In cloud computing, the term "cloud" is used to refer to a large number of computing system resources that are distributed over multiple locations or data centers but that work together and share resources to provide a common service (data storage, etc.) without direct active management by a user. As used in this specification, the term "local cloud" denotes a cloud that is provided within a local area network (LAN), in which a plurality of devices within the LAN share resources and capabilities to provide a common service without direct active management by a user. For example, available processing capacities of the plurality of devices in the LAN may be used to create the local cloud. As such, the local cloud may refer to a cloud created by local devices connected to or communicably coupled within the LAN via wired connections, wireless connections, or a combination of wired and wireless connections. For example, the available resources of various local devices (e.g., devices 320, 330, 340, 360, 370) connected within the LAN 310, as shown in FIG. 3, may be used to create a cloud (referred to as a "local cloud") that operates locally. Embodiments are not limited to this configuration and may be implemented by other devices/servers to establish a local cloud.

The configuration of the local cloud server may include assigning any device in the local network as a master 370 (via any election protocol), which would be responsible for enlisting other devices within the LAN. The master device may also manage task assignment to those devices including migration within the local area network for various participating devices/slaves. The term device and slave may be used interchangeably to refer to any device within the LAN.

Assigning the master device is not limited to election protocols. As such, there may be various ways of assigning the master device.

For example, the router may assign a device in the network as master based on any election protocol, which may use the device's computing resource as a parameter for decision making. The router may also act as the master if the router has enough available resources.

Any device in the network which initiates the process may as well choose itself to be the master, or may initiate an election protocol for master selection.

The master assignment may be performed during the LAN initialization or may be initiated as per the request arrival. The master selection at initialization is preferred as the master has the knowledge about the resource availability before any requests arrive to help the master device perform better capacity planning.

Figure 4:
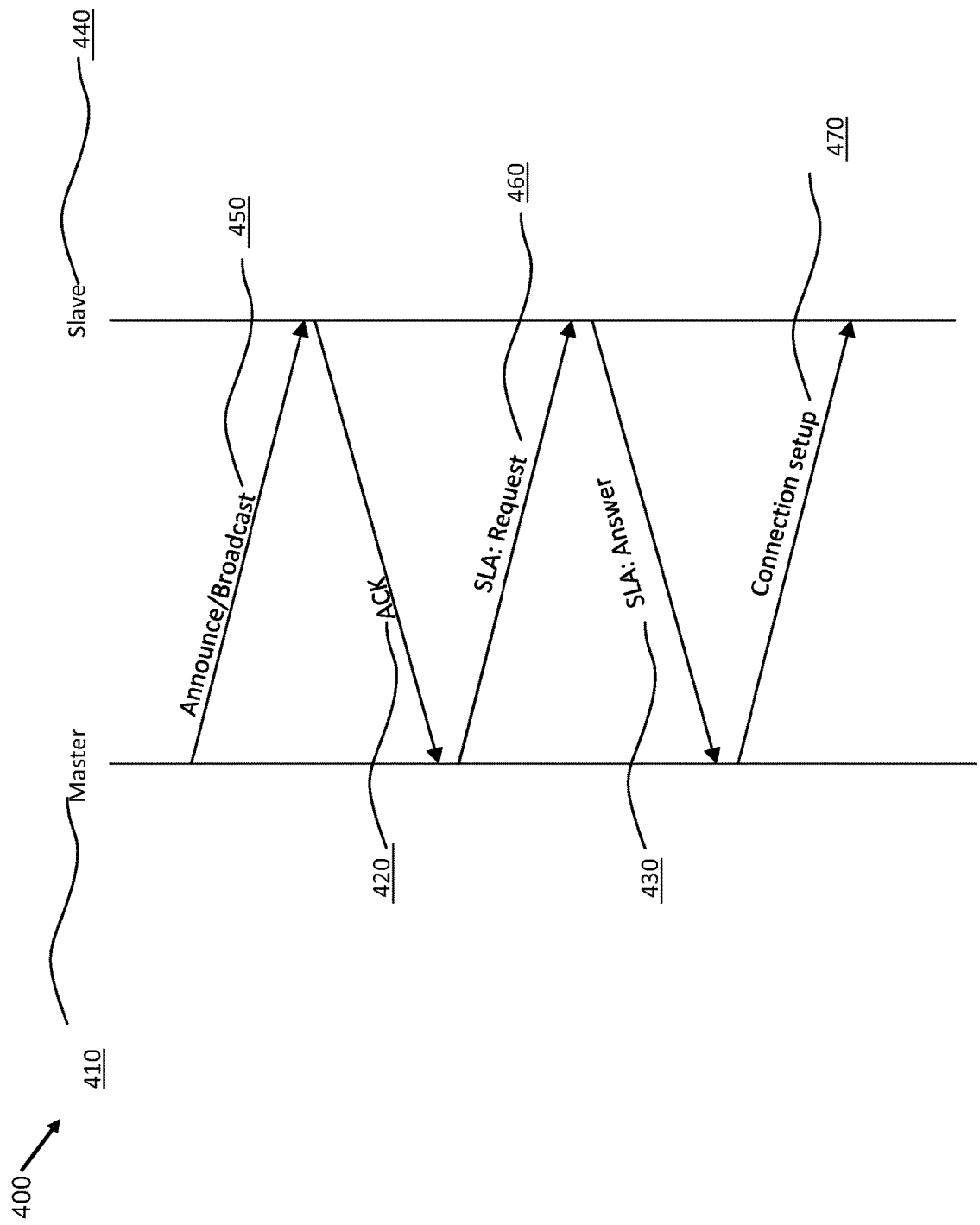
FIG. 4 is a diagram of a master-slave connection according to some embodiments.

FIG. 4 shows an embodiment of a master 410-slave 440 connection setup/configuration. Based on a request for establishing a local cloud, the master 410 may broadcast messages 450 to discover other devices/slaves 440 in the local network. If the slaves agree to the broadcasted messages, the slave may send acknowledgements 420 to the server. The master may subsequently respond with the SLA request 460, which may include requests for the slave to share the slave's resources including the resource availability time and the power availability. If the slave agrees, the slave may send an SLA answer 430. As a result, the master may setup the connection 470 (e.g. master-slave connection). The slave may also share information such as a number of active apps on the device and the energy consumption of the device. The slave may also be required to share such information during the connection session.

Figure 5:
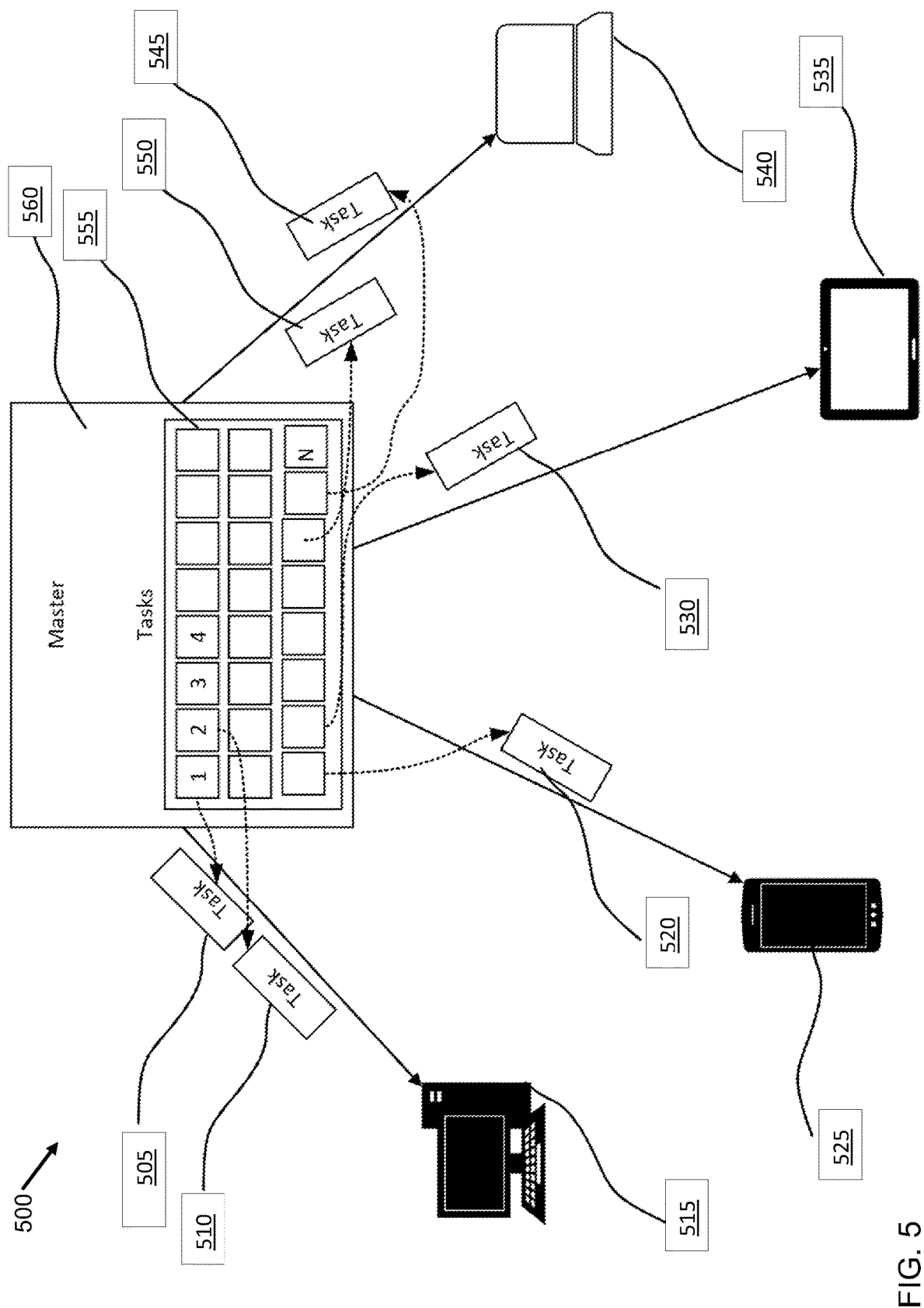
FIG. 5 is a schematic diagram of a master-slave connection allocating tasks, according to some embodiments.

After the master 410 receives the SLA answer 430 from the slave 440, the master may start assigning tasks to various slaves as soon as the master receives the SLA answer from the slaves while setting up the master-slave connection. FIG. 5 shows an example of the master-slave task assignment. The master 560 may need to assign the tasks 555 to the slave devices 515, 525, 535, and 540. The master 560 may divide the tasks 555 into sub-tasks 505, 510, 520, 530, 545, 550.

In some embodiments, the master may use the device's resource availability such as storage that the slave is willing to lease, the total storage capacity of the slave along with the power availability of the slave to assign tasks.

In some embodiments, when the slave wants to disconnect and no longer be used in the local cloud for any reason, the slave may not be able to disconnect right away. Instead, the master may first check the slave status, and whether the slave has any active tasks running or not. Next, the slave may choose to finish the current task before disconnecting or may wait for the master to migrate the task to another device in the network. In the case that a device disconnects due to network issues or any other issues, the master may reassign the tasks allocated to the disconnected device to another device in the network. In some embodiments where the master wants to disconnect, the next in-line device may be assigned as the new master.

In some embodiments, a LAN cloud may be used as a subscription-based service where the owner of the LAN leases computing and storage resources in-return of payment. For example, the local cloud may be used to store images/files or perform some image processing tasks.

The local area cloud may also be used to perform any task for any device within the local area cloud's network. For example, if any device in the network is streaming Immersive media and does not have enough resources to process incoming media streams (decoding, stitching), the device may ask the master in the network to process the media on its behalf.

A methodology of using LAN as service for edge cloud may be implemented as computer software using computer-readable instructions and physically stored in one or more computer-readable media. For example, FIG. 6 shows a computer system 600 suitable for implementing some embodiments.

The computer software may be coded using any suitable machine code or computer language that may be subject to assembly, compilation, linking, or like mechanisms to create code comprising instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

Figure 6:
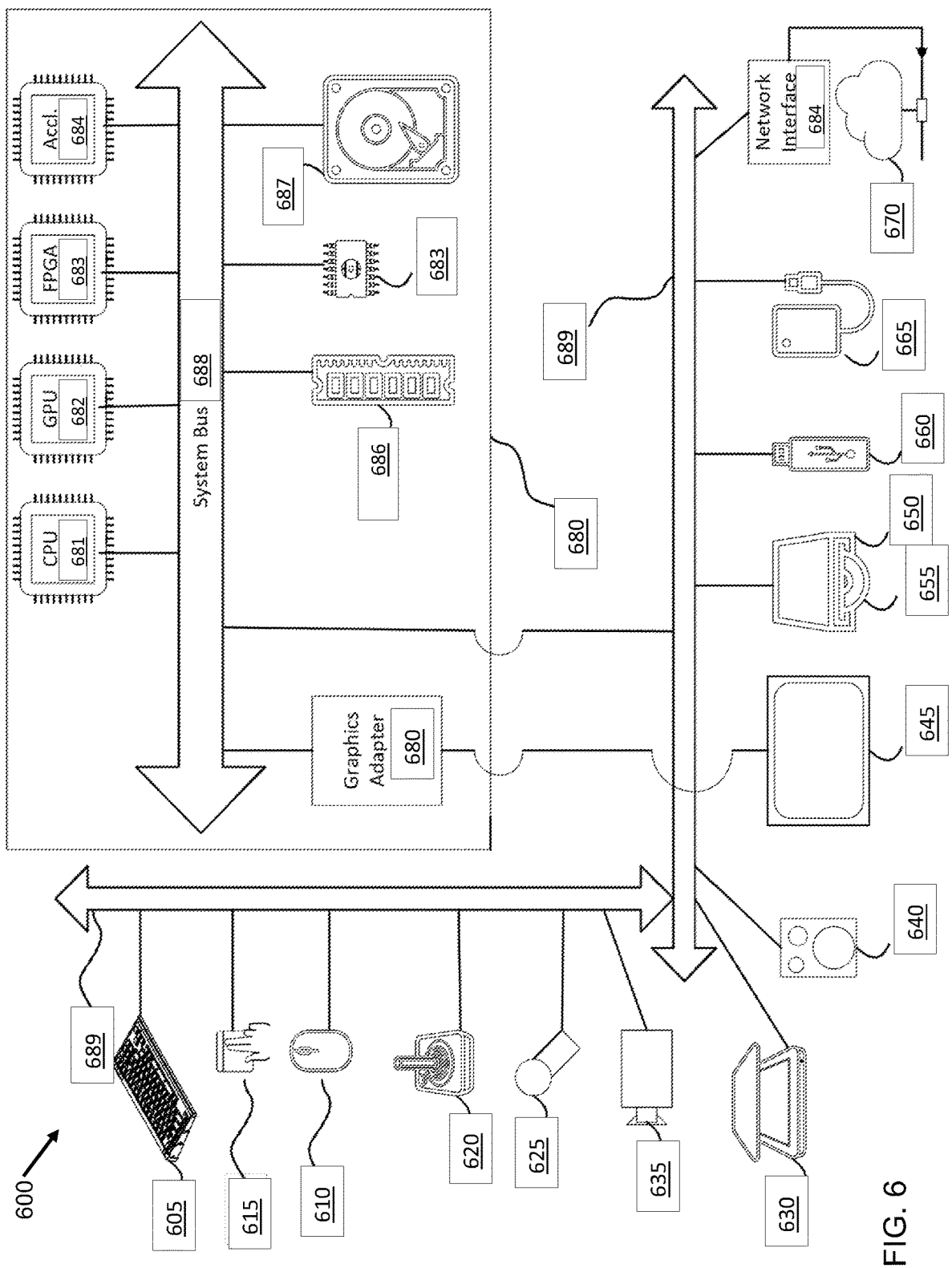
FIG. 6 is a schematic diagram of a computer system according to some embodiments.

The components shown in FIG. 6 for computer system 600 are exemplary and are not intended to suggest any limitation as to the scope of use or functionality of the computer software implementing embodiments of the present disclosure. Likewise the configuration of components should not be limited to be interpreted as having any dependency or requirement relating to any one or combination of components illustrated in the exemplary embodiment of a computer system 600.

Computer system 600 may include certain human interface input devices. Such a human interface input device may be responsive to input by one or more human users through, for example, tactile input (such as keystrokes, swipes, data glove movements), audio input (such as voice, clapping), visual input (such as gestures), olfactory input (not depicted). The human interface devices may also be used to capture certain media not necessarily directly related to conscious input by a human, such as audio (such as speech, music, ambient sound), images (such as scanned images, photographic images obtained from a still image camera), video (such as two-dimensional video, three-dimensional video including stereoscopic video).

Input human interface devices may include one or more of (only one of each depicted): keyboard 605, mouse 610, trackpad 615, touch screen 645, data-glove (not depicted), joystick 620, microphone 625, scanner 630, camera 635.

Computer system 600 may also include certain human interface output devices. Such human interface output devices may be stimulating the senses of one or more human users through, for example, tactile output, sound, light, and smell/taste. As such, the human interface output devices may include tactile output devices (for example, tactile feedback by the touch-screen 645, data-glove (not depicted), or joystick 620, but there may also be tactile feedback devices that do not serve as input devices), audio output devices (such as speakers 640, headphones (not depicted)), visual output devices (such as screens 645 to include CRT screens, LCD screens, plasma screens, OLED screens, each with or without touch-screen input capability, each with or without tactile feedback capability—some of which may be capable to output two-dimensional visual output or more than three-dimensional output through means such as stereographic output; virtual-reality glasses (not depicted), holographic displays and smoke tanks (not depicted)), and printers (not depicted).

Computer system 600 may also include human accessible storage devices and their associated media such as optical media including CD/DVD ROM/RW Z20 with CD/DVD or the like media 655, thumb-drive 660, removable hard drive or solid-state drive 665, legacy magnetic media such as tape and floppy disc (not depicted), specialized ROM/ASIC/PLD based devices such as security dongles (not depicted), and the like.

Those skilled in the art should also understand that term "computer-readable media" as used in connection with the presently disclosed subject matter does not encompass transmission media, carrier waves, or other transitory signals.

Computer system 600 may also include an interface to one or more communication networks. Networks can, for example, be wireless, wireline, optical. Networks may further be local, wide-area, metropolitan, vehicular, and industrial, real-time, delay-tolerant, and so on. Examples of networks include local area networks such as Ethernet, wireless LANs, cellular networks to include GSM, 3G, 4G, 5G, LTE, and the like, TV wireline or wireless wide-area digital networks to include cable TV, satellite TV, and terrestrial broadcast TV, vehicular and industrial to include CANBus, and so forth. Certain networks commonly require external network interface adapters that are attached to certain general-purpose data ports or peripheral buses 689, for example, USB ports of the computer system 600; others are commonly integrated into the core of the computer system 600 by attachment to a system bus as described below (for example Ethernet interface into a PC computer system or cellular network interface into a smartphone computer system). Using any of these networks, the computer system 600 may communicate with other entities. The communication may be uni-directional, receive only (for example, broadcast TV), uni-directional send-only (for example, CANbus to certain CANbus devices), or bi-directional, for example, to other computer systems using local or wide area digital networks. Certain protocols and protocol stacks may also be used on each of those networks and network interfaces, as described above.

The aforementioned human interface devices, human-accessible storage devices, and network interfaces may be attached to a core 680 of the computer system 600.

The core 680 may include one or more Central Processing Units (CPU) 681, Graphics Processing Units (GPU) 682, specialized programmable processing units in the form of Field Programmable Gate Areas (FPGA) 683, hardware accelerators for certain tasks 684, and so forth. These devices, along with Read-only memory (ROM) 685, Random-access memory 686, internal mass storage such as internal non-user accessible hard drives, SSDs, and the like 687, may be connected through a system bus 688. In some computer systems, the system bus 688 may be accessible in the form of one or more physical plugs to enable extensions by additional CPUs, GPU, and the like. The peripheral devices may also be attached either directly to the core's system bus 688 or through a peripheral bus 689. Architectures for a peripheral bus include PCI, USB, and the like.

CPUs 681, GPUs 682, FPGAs 683, and accelerators 684 may execute certain instructions that, in combination, may make up the aforementioned computer code. Such computer code may be stored in ROM 685 or RAM 686. Transitional data may also be stored in RAM 686, whereas permanent data may be stored, for example, in the internal mass storage 687. Fast storage and retrieval to any of the memory devices may be enabled through the use of cache memory, which may be closely associated with one or more CPU 681, GPU 682, mass storage 687, ROM 685, RAM 686, and the like.

The computer-readable media may have computer code thereon for performing various computer-implemented operations. The media and computer code may be specially designed and constructed for the purposes of the present disclosure, or they may be of the kind well known and available to those having skill in the computer software arts.

As an example, and not by way of limitation, the computer system having architecture 600, and specifically the core 680, may provide functionality as a result of processor(s) (including CPUs, GPUs, FPGA, accelerators, and the like) executing software embodied in one or more tangible, computer-readable media. Such computer-readable media may be media associated with user-accessible mass storage as introduced above, as well as certain storage of the core 680 that are of non-transitory nature, such as core-internal mass storage 687 or ROM 685. The software implementing various embodiments of the present disclosure may be stored in such devices and executed by core 680. A computer-readable medium may include one or more memory devices or chips, according to particular needs. The software may cause the core 680 and specifically the processors therein (including CPU, GPU, FPGA, and the like) to execute particular processes or particular parts of particular processes described herein, including defining data structures stored in RAM 686 and modifying such data structures according to the processes defined by the software. In addition, or as an alternative, the computer system may provide functionality as a result of logic hardwired or otherwise embodied in a circuit (for example, accelerator 684), which may operate in place of or together with software to execute particular processes or particular parts of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

Figure 7:
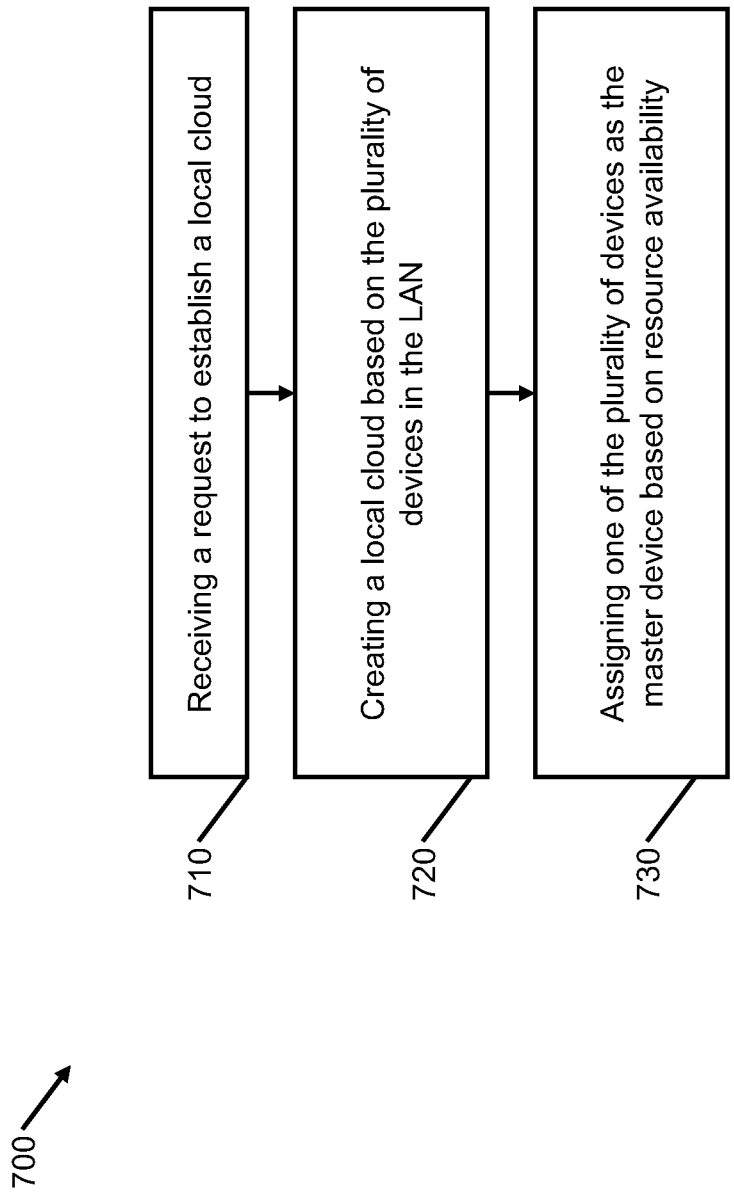
FIG. 7 is a flowchart of a method using LAN as service for edge cloud according to some embodiments.

FIG. 7 is a flowchart of an embodiments of a process 700 for creating a local cloud using LAN as a service for an edge cloud.

As shown in FIG. 7, at operation 710 of process 700, a request to establish a local cloud is received. The process proceeds to operation 720, where the local cloud is created using the plurality of devices in the LAN, as shown in FIG. 3, for example.

Process 700 then proceeds to operation 730, where one of the plurality of devices in the LAN is assigned as the master device. The master device is then used to broadcast messages and discover the other devices in the LAN. That is, the master configures the local cloud and is able to establishes master-slave connections, as shown in FIG. 4. As such, the master may allocate tasks to the plurality of devices in the LAN, as shown in FIG. 5. The master may migrate and reassign tasks among the plurality of device/slaves in the LAN.

The foregoing disclosure provides illustration and description, but is not intended to be exhaustive or to limit the embodiments to the precise form disclosed. Modifications and variations are possible in light of the above disclosure or may be acquired from practice of the embodiments. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the embodiments. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible embodiments. In fact, many of these features may be combined in ways not specifically recited in the claims and/or disclosed in the specification. Although each dependent claim listed below may directly depend on only one claim, the disclosure of possible embodiments may include each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

What is claimed is:

1. A method comprising:
  initiating, by a first user device among a plurality of user devices within a Local Area Network (LAN), a process to create a local cloud server within the LAN, wherein the local cloud server comprises the plurality of user devices within the LAN;
  the first device that initiates the process to create the local cloud server acting as a master device of the local cloud server;
  broadcasting, by the master device to one or more devices from among the plurality of user devices, a request to share resource availability of each of the one or more devices for the local cloud server;
  receiving, by the master device, from each of the one or more devices the resource availability of each of the one or more devices for the local cloud server;
  configuring, by the master device, the one or more devices to be part of the local cloud server; receiving, by the master device from a first device within the local cloud server, a service request for a service to be performed by the local cloud server;
  distributing, by the master device, a plurality of tasks corresponding to the service to the one or more devices configured as the local cloud server according to the resource availability of the one or more devices;
  receiving, by the master device from a second device within the local cloud server, a disconnection request;
  checking, by the master device, whether any tasks are active on the second device; and based on determining that there is at least one active task on the second device, disconnecting the second device from the local cloud server subsequent to migrating the at least one active task on the second device to a third device from the local cloud server.

2. The method of claim 1, wherein the resource availability comprises a processing capacity, a storage capacity and a power.

3. The method of claim 1, wherein the first device is a router in the LAN.

4. The method of claim 1, wherein the one of the plurality of user devices initiates an election protocol to assign the master device.

5. The method of claim 1, wherein the master device is selected during LAN initialization prior to the service request.

6. An apparatus comprising:
at least one memory configured to store computer program code; and
at least one processor configured to access said at least one memory and operate as instructed by said computer program code, said computer program code including:
first initiating code configured to cause the at least one processor to initiate, by a first user device among a plurality of user devices within a Local Area Network (LAN), a process to create a local cloud server within the LAN, wherein the local cloud server comprises the plurality of user devices within the LAN;
first selecting code configured to cause the at least one processor to appoint, by the first device that initiates the process to create the local cloud server, itself as a master device of the local cloud server;
broadcasting code configured to cause the at least one processor to broadcast, by the master device to one or more devices from among the plurality of user devices, a request to share resource availability of each of the one or more devices for the local cloud server;
first receiving code configured to cause the at least one processor to receive, by the master device, from each of the one or more devices the resource availability of each of the one or more devices for the local cloud server;
configuration code configured to cause the at least one processor to configure, by the master device, the one or more devices to be a part of the local cloud server;
second receiving code configured to cause the at least one processor to receive, by the master device from a first device within the local cloud server, a service request for a service to be performed by the local cloud server;
distributing code configured to cause the at least one processor to distribute, by the master device, a plurality of tasks corresponding to the service to the one or more devices configured as the local cloud server according to the resource availability of the one or more devices;
third receiving code configured to cause the at least one processor to receive, by the master device from a second device within the local cloud server, a disconnection request;
checking code configured to cause the at least one processor to check, by the master device, whether any tasks are active on the second device; and
first determining code configured to cause the at least one processor to, based on determining that there is at least one active task on the second device, disconnect the second device from the local cloud server subsequent to migrating the at least one active task on the second device to a third device from the local cloud server.

7. The apparatus of claim 6, wherein the resource availability comprises a processing capacity, a storage capacity and a power.

8. The apparatus of claim 6, wherein the first device is a router in the LAN.

9. The apparatus of claim 6, wherein the one of the plurality of user devices initiates an election protocol to assign the master device.

10. The apparatus of claim 9, wherein the master device is selected during LAN initialization prior to, the service request.

11. A non-transitory computer-readable recording medium that stores computer code which, when executed by at least one processor, causes the at least one processor to at least:
initiate, by a first user device among a plurality of user devices within a Local Area Network (LAN), a process to create a local cloud server within the LAN, wherein the local cloud server comprises the plurality of user devices within the LAN;
appointing, by the first device that initiates the process to create the local cloud server, itself as a master device of the local cloud server;
broadcast, by the master device to one or more devices from among the plurality of user devices, a request to share resource availability of each of the one or more devices for the local cloud server;
receive, by the master device, from each of the one or more devices the resource availability of each of the one or more devices for the local cloud server;
configure, by the master device, the one or more devices to be a part of the local cloud server;
receive, by the master device from a first device within the local cloud server, a service request for a service to be performed by the local cloud server;
distribute, by the master device, a plurality of tasks corresponding to the service to the one or more devices configured as the local cloud server according to the resource availability of the one or more devices;
receive, by the master device from a second device within the local cloud server, a disconnection request;
check, by the master device, whether any tasks are active on the second device; and
based on determining that there is at least one active task on the second device, disconnect the second device from the local cloud server subsequent to migrating the at least one active task on the second device to a third device from the local cloud server.

12. The non-transitory computer-readable medium of claim 11, wherein the resource availability comprises a processing capacity, a storage capacity and a power.

13. The non-transitory computer-readable medium of claim 11, wherein the first device is a router in the LAN.

14. The non-transitory computer-readable medium of claim 11, wherein the one of the plurality of user devices initiates an election protocol to assign the master device.

15. The non-transitory computer-readable medium of claim 11, wherein the master device is selected during LAN initialization prior to, the service request.

* * * * *